(12) United States Patent
Kuhnen et al.

(10) Patent No.: US 9,032,487 B2
(45) Date of Patent: May 12, 2015

(54) METHOD AND SYSTEM FOR PROVIDING SERVICE ACCESS TO A USER

(75) Inventors: Marcus Kuhnen, Heidelberg (DE); Joao Girao, Ludwigshafen (DE); Yukiko Endo, Dresden (DE)

(73) Assignee: NEC Europe Ltd., Heidelberg (DE)

( * ) Notice: Subject to any disclaimer, the term of this patent is extended or adjusted under 35 U.S.C. 154(b) by 0 days.

(21) Appl. No.: 13/824,786

(22) PCT Filed: Nov. 11, 2011

(86) PCT No.: PCT/EP2011/069968
§ 371 (c)(1),
(2), (4) Date: May 2, 2013

(87) PCT Pub. No.: WO2012/062915
PCT Pub. Date: May 18, 2012

(65) Prior Publication Data
US 2013/0219474 A1      Aug. 22, 2013

(30) Foreign Application Priority Data

Nov. 11, 2010   (EP) ..................................... 10014494

(51) Int. Cl.
*G06F 15/16*   (2006.01)
*H04L 29/06*   (2006.01)

(52) U.S. Cl.
CPC ............ *H04L 63/08* (2013.01); *H04L 63/0884* (2013.01)

(58) Field of Classification Search
CPC ... H04L 63/08; H04L 63/0884; H04L 63/162; H04L 63/166; H04L 63/0815; H04L 67/14; H04L 63/20; H04L 63/105; H04L 63/083; H04L 63/102; H04L 12/24; H04L 29/12066; H04L 41/00; H04L 41/0893; H04L 41/5003; H04L 61/1511; H04L 63/0853; H04L 63/10; H04L 63/123; H04L 63/18; H04L 9/3226; H04L 9/3234; H04L 63/0823; H04L 63/0807; H04L 2209/56; H04L 2209/80; H04L 2463/101; H04L 63/0421; H04L 63/101; H04L 67/30; H04L 69/329; H04L 9/3213; H04L 9/3271; G06F 21/31; G06F 21/64; G06F 2221/2131; G06F 21/33; G06F 21/41; G06F 21/305; G06F 21/335; G06F 21/34; G06F 21/6254; G06F 21/629; G06F 2221/2103; G06F 2221/2115; G06F 2221/2119; G06F 2221/2129; G06F 2221/2141
USPC .................................. 726/2–7; 713/168, 170
See application file for complete search history.

(56) References Cited

U.S. PATENT DOCUMENTS

| | | | |
|---|---|---|---|
| 7,360,245 B1 | | 4/2008 | Ramachandran et al. |
| 8,544,066 B2 * | | 9/2013 | Hatakeyama ..................... 726/4 |
| 2003/0196107 A1 | | 10/2003 | Robertson et al. |
| 2008/0250248 A1 * | | 10/2008 | Lieber ........................... 713/183 |
| 2011/0041003 A1 * | | 2/2011 | Pattar et al. .................... 714/4.3 |

FOREIGN PATENT DOCUMENTS

WO        2011/023228 A1      3/2011

OTHER PUBLICATIONS

International Search Report, dated May 11, 2012, from corresponding PCT application.

* cited by examiner

*Primary Examiner* — Thanhnga B Truong
(74) *Attorney, Agent, or Firm* — Young & Thompson

(57) ABSTRACT

A method and system for providing service access to a user, includes the steps of:
  a) Registering a local identity provider located in al local network at a global identity provider with a local identifier of the local identity provider, b) Requesting service access requiring identity authentication to a service provider by a user located in the local network,
c) Requesting an identity management service from the global identity provider by the service provider,
d) Redirecting the user's access request to the local identity provider according to the provided local identifier within the local network,
e) Checking if the local identifier corresponds to the local network of the user,
f) Providing the requested identity management service to the service provider by the global identity provider in accordance with a result of the checking according to step e), and
g) Granting service access for the user to the service provider.

18 Claims, 1 Drawing Sheet

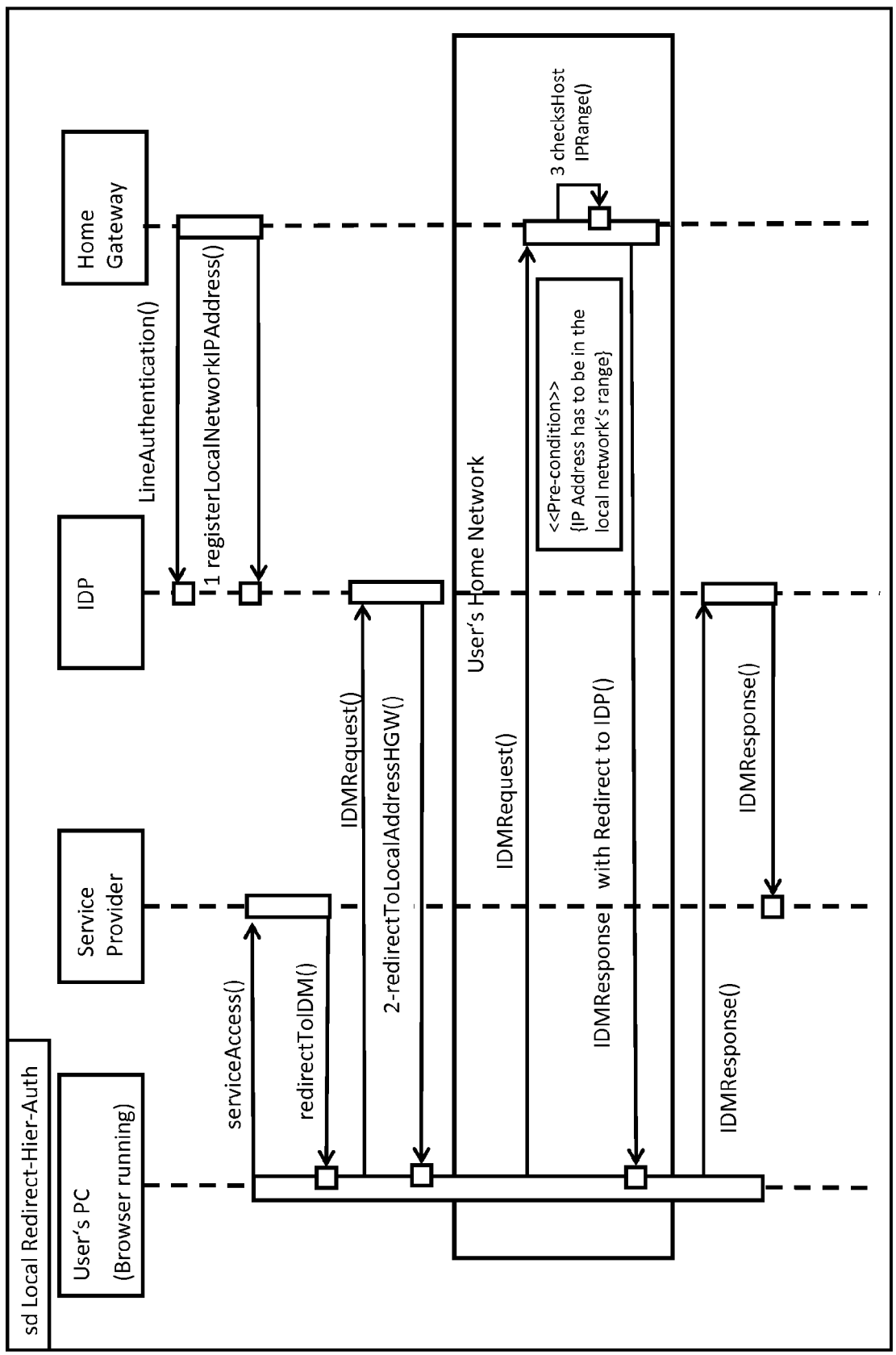

METHOD AND SYSTEM FOR PROVIDING SERVICE ACCESS TO A USER

BACKGROUND OF THE INVENTION

1. Field of the Invention

The invention relates to a method for providing service access to a user and a system for providing service access to a user.

2. Description of the Related Art

Identity management systems in general refer to an information system which can be used to support the management of identities, including establishing, describing and destroying identities or following identity activity. Identity management may be in particular used to identify an authorized access to a computer network for a user or a certain group of users. To obtain access requiring an authentication of the user to a service computer or network, an identity management protocol may be used like SAML or OpenID. A user might use a client on his local computer for requesting an identity management service. When a user requests a service requiring authentication a service provider connected to the computer of a user contacts a corresponding identity provider via its internet service provider through a redirect on the browser of the client for authentication. It is also possible that further identity providers may be also contacted by the browser of the user continuing to act as a virtual proxy between the service provider(s) and the identity providers.

However, when contacting the identity provider by a service provider through a redirect this might lead to security problems. For example attacks in form of a "denial of service" attack or even worst phishing attacks are possible. The user is taken advantage of by an attacker redirecting the user to a website which is under control of the attacker and the attacker uses the redirect function to keep himself in the middle of all communication between the user, the identity providers and/or the service providers.

To overcome this disadvantage the use of secure transport protocols or secure service protocols might be used. This provides a slightly increased security level although attacks are still possible due to a disconnect between the content to be transmitted and the security context or simply due to usability.

If, for example, identity management services are provided by the user itself or a company or enterprise the server providing these services and located within a local area network, e.g. a company network, usually needs to be accessible to and from the outside, in particular to the internet, so that users may indirectly request identity management services from outside. This opens further possibilities for attacks: attacks on transmission protocols between the user's computer and protocols and services running on a local interface of the server acting as identity service provider of the user or the company or enterprise.

In summary phishing or denial of service attacks are still possible: An identity management service is requested and the user may be intercepted by an attacker and redirected to the attacker's website during the redirect to the identity service provider. The attacker mimics the identity service provider and acts as a selective forwarder to the identity service provider. The attacker may then snoop on messages, modify commands or simply collect authentication data and/or authentication assertions for later fraudulent use with other services.

Another main problem are attacks on internal servers: when offering identity management services which are and should be publically available, users and/or computers in local enterprise or company networks may be attacked from any computer in the internet. The attacker uses the fact that the identity management services need to be available for use from any outside and inside location and therefore the corresponding servers providing these services have to be available publically. An attacker might then identify particular types of software and/or hardware in the home network of a user or in a local company network and try to use known security leaks or special characteristics of the hard- and/or software to obtain access to the corresponding network.

Since identity management services in home networks, in particular for home servers comprising home gateways or the like, are usually developed under less rigorous security requirements than their enterprise or carrier grade counterparts, software bugs or oversights may be exploited to gain access to the user data or to its local network without consent of the user.

BRIEF SUMMARY OF THE INVENTION

It is therefore an objective of the present invention to provide a method and a system for providing service access to a user enabling a higher security level.

It is a further objective of the present invention to provide a simple method and system for providing service access to a user which is at the same time more secure.

It is a further objective of the present invention to reduce potential phishing or denial-of-service attacks.

In accordance with the invention, the afore-mentioned objects are accomplished by a method for providing service access to a user.

According to at least one embodiment, a method for providing service access to a user, includes the steps of:
  a) Registering a local identity provider located in al local network at a global identity provider with a local identifier of the local identity provider,
  b) Requesting service access requiring identity authentication to a service provider by a user located in the local network
  c) Requesting an identity management service from the global identity provider by the service provider,
  d) Redirecting the user's access request to the local identity provider according to the provided local identifier within the local network,
  e) Checking if the local identifier corresponds to the local network of the user,
  f) Providing the requested identity management service to the service provider by the global identity provider in accordance with a result of the checking according to step e), and
  g) Granting service access for the user to the service provider.

In accordance with the invention the afore-mentioned objectives are also accomplished by a system for providing service access to a user.

According to at least one embodiment, a system for providing service access to a user includes a user computer located in a local network for a user for accessing service of a service provider requiring authentication located in a global network, a local identity provider, preferably a home gateway located in the local network and connected to the user computer having a local identifier and connected to a global network, and a global identity provider, connected to the global network, preferably the Internet, and to the local network.

Such a system is characterized in that the local identity provider is associated with the local identifier and is formed such to register at the global identity provider with the local identifier, and that an identity management service from the global identity provider by the service provider is requested, when the user requests service access to the service provider and that the global identity provider is formed such to redirect the user's access request to the local identity provider according to the provided local identifier within the local network, and that the local identity provider is formed such to check if the local identifier corresponds to the local network of the user, and that the global identity provider is formed such to provide the requested identity management service to the service provider according to a result of the check and that the service provider is formed such to grant access for the user according to the provided identity management service.

According to the invention it has first been recognized that a security level is increased when providing identity management services and service access. It has further been first recognized according to the invention that the risk in particular of man-in-the-middle attacks is reduced. It has further been first recognized according to the invention that internal local network infrastructure is protected from external attacks. According to the invention it has further been first recognized that a user might control the exposure of own data and identity management functions. It has further been first recognized that a method and a system according to the invention allow that private data of a user does not have to be stored in a public network therefore may be stored in a local network although accessible from the public network by conventional identity management protocols.

A basic idea according to the invention is therefore to use a local identifier when redirecting a user's access request to the local identity provider. This means that a communication between the user and the local identity provider is actually or virtually on the local network of the user and the local identity provider and cannot be reproduced by the so-called "man-in-the-middle" or phisher.

In particular the method according to the invention may be divided in two parts, namely a registration phase and an operation phase. During the registration phase, the local identity provider registers with the global identity provider. This registration will provide a local identifier from the local network to the global identity provider. The local identity provider may for example be located in an enterprise or enterprise network and/or in form of a home gateway, preferably located within a home network. This will be the identifier used during the subsequent operation phase. During the operation phase the global provider will use the registered local identifier to connect the user to the local identity provider distinguishing from conventional methods, that the local identifier passed on to the user is only accessible through the local network.

According to a preferred embodiment of the present invention at least step a) includes initiating a session between the local identity provider and the global identity provider, preferably for a predetermined time-period. Initiating a session between the local identity provider and the global identity provider provides an easy connection establishment and reliable as well as more secure connection for registering the local identity provider at the global identity provider with a local identifier. If the session is initiated for a predetermined time-period the security level can be even further increased since possible attacks on the global identity provider or the local identity provider are only possible during the same session.

According to a further preferred embodiment of the present invention the user is connected to its local network by a virtual private network, a tunnel application or a reverse NAT. When using a virtual private network the user is connected to its local network by a secure connection. The user may then use for example publically available hotspots, hotel networks or the like to connect to its local network and the user might then request services from global service providers. In certain cases the user might not been allowed to connect through a virtual private network to its local network. The user might then use a tunnel application providing a secure tunnel to access its local network. The local IP address the global identity provider provides to the user might be transmitted via the secure tunnel from the computer of the user to a local gateway for the local network. The user might then use the local IP address from the global identity provider to connect via the secure tunnel to the local identity provider in the local network. This provides a flexible way with a plurality of options to connect the user to its local network from computers or access points throughout the world via internet.

According to a further preferred embodiment at least the registering according to step a) uses a transport security protocol and/or a service security protocol. This further enhances the level of security for the method for providing an identity management service to a user.

According to a further preferred embodiment the local identifier is provided in form of an IP-address and/or a MAC-address. The use of an IP- and/or MAC-address provides and easy and reliable way for later checking, if the local identifier in form of the IP-address and/or the MAC-address corresponds to a local network of a user.

According to a further preferred embodiment at least the registering according to step a) uses HTTPS transport security protocol. This provides enhanced security when registering a local identity provider at the global identity provider on the transport level.

According to a further preferred embodiment at least the registering according to step a) uses XML-SIG and/or XML-ENC service security protocol. This provides enhanced security when registering the local identity provider at the global identity provider with the local identifier on the service level.

According to a further preferred embodiment of the system, the local identity provider is a home gateway for connecting the local network to the global network. The use of a gateway provides a reliable connection of the local network to the global network without any further loss in security of the local network.

According to a further preferred embodiment the user computer is connected to the local identity provider by a virtual private network, a tunnel application or a reverse NAT. When using a virtual private network the user's computer is connected to its local network by a secure connection. The user may then use for example publically available hotspots, hotel networks or the like to connect to its local network and the user might then request services from global service providers. In certain cases the user might not be allowed to connect through a virtual private network to its local network. The user might then use a tunnel application providing a secure tunnel to access its local network. The local IP address the global identity provider provides to the user might be transmitted via the secure tunnel from the computer of the user to a local gateway for the local network. The user might then use the local IP address from the global identity provider to connect via the secure tunnel to the local identity provider in the local network. This provides a flexible way with a plurality of options to connect the user to its local network from computers or access points throughout the world via internet.

According to a further preferred embodiment network traffic communication in the local network is encrypted. This provides an even higher security level when providing an identity management service for a user reducing attacks from within the local network to gain access to the identity service provider or identity management services.

According to a further preferred embodiment the check of the local identifier of the local identity provider is MAC-address and/or IP-address based. The use of an IP- and/or MAC-address provides and easy and reliable way for later checking if the local identifier in form of the IP-address and/or the MAC-address corresponds to a local network of a user.

BRIEF DESCRIPTION OF THE DRAWINGS

There are several ways how to design and further develop the teaching of the present invention in an advantageous way. To this end, it is to be referred to the patent claims and to the following explanation of a preferred example of an embodiment of the invention illustrated by the drawing on the other hand. In connection with the explanation of the preferred example of an embodiment of the invention by aid of the drawing, generally preferred embodiments and further developments of the teaching will be explained. In the drawings, FIG. 1 is a flow chart of a method according to an embodiment of the present invention.

DETAILED DESCRIPTION OF THE PREFERRED EMBODIMENTS

In FIG. 1 there is shown a flow chart of a method for providing service access to a user in an embodiment. On a user's PC a browser is running for requesting a service access to a service provider. To gain access to services of the service provider authentication is required. The user's PC is located in a local network. In the local network also a local identity provider in form of a home gateway to connect to a global identity provider (denoted with IDP) is located. The connection between the user's PC and the home gateway may be in form of a virtual private network, a tunnel application or a reverse NAT.

First of all the home gateway performs a line authentication towards the global identity provider IDP. After the line authentication with the global identity provider IDP the home gateway registers its local network IP-address at the global identity provider IDP. When a user requests service access (in FIG. 1 denoted by the arrow service access) requiring authentication via its user PC from a service provider the global identity provider IDP is contacted and an identity management service for authentication is requested by the service provider from the global identity provider. The identity management service request is then redirected to the local identity provider in form of the home gateway. To perform the redirection the local identifier in form of the local network IP address of the home gateway is used.

When the identity management service request (IDM request in user's home network in FIG. 1) is received by the home gateway, the home gateway checks if the local identifier corresponds to the local network, for example if the local identifier is a local network IP address, the host IP range is checked, if the local network IP address of the user's PC is within the local network range. If the local network IP address of the user's PC is not within the local network the authentication cannot be successful and the request is dropped. If the checking is successful the local identity provider in form of the home gateway provides authentication information for the requested identity management service to the service provider, so that the user's PC and therefore the user may receive the requested identity management service from the service provider and is granted access to the service provider for accessing the services requested by the user.

It is also possible to use a home identity provider as a local identity provider in the user's device, preferably a user PC. The local identifier, preferably in form of an IP-address which has to be registered and used to connect the user to its global identity provider would then be in case of an IP address "local host" or 127.0.0.1. All communication relating to the requested identity management service would be performed on the user PC or user device and may still used without any difference.

By using a local identifier the user's device, preferably the user's PC connected directly to the local network or through a virtual private network is not accessing its local identity provider via a global network, for example the internet. The user may be sure that if the user's local identity provider pops up in the browser of the user, there is no chance for a man-in-the-middle-attack, since the assumption is that attackers are not allowed to have access to the local network of the user. The publically available service provider or global identity provider is able to confirm the request of the user that it originates from the local network and the global identity provider and thus the service provider is able to verify the authenticity of the user via the above mentioned method. A further internal network identification, for example based on MAC- or IP-addresses may be provided to facilitate user experience.

The present invention provides in particular a registration of home or enterprise authorized devices for discovery in an identity management system, a relocation of user data to a local network trusted by the user, wherein a usage of the aforementioned discovering mechanism respectively method provides redirecting a browser of the user to a local network interface to prevent attacks for example phishing, denial of service and/or scanning so that all user's data may be placed in the users own local network and the user has access to it.

In summary the present invention has inter alia the following advantages: the present invention prevents most attacks, in particular phishing on the transport of identity management messages by using a local network increasing the security level. The present invention further protects internal network elements from external attacks by making identity management functions in the local network only available to devices located in the local network brokered via the user. The present invention further allows a user to clearly control the exposure of data of the user and identity management functions. A further advantage of the present invention is that it reduces the liability of an identity provider in relation to the local network for user data meaning that the user's data may be stored in the local network of the user and is still accessible with standard identity management protocols.

The present invention thus improves the user's security and privacy when dealing with private data reducing phishing or man-in-the-middle-attacks.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiment disclosed and that modifications and other embodiments are intended to be included within the scope of the appended claims. Although specific terms are employed herein, they are used in a generic and descriptive sense only and not for purposes of limitation.

It is inter alia an option that instead of a line authentication a 3GPP/IMS authentication may be used to provide a further secure registration of a local identifier with the global identity provider. If the global identity provider is an internet service provider the authentication with the internet service provider may also be used to register the local identity provider. Other security mechanisms may also be used, for example other authentication methods, which become necessary if the local identity provider supports multiple users or transport level security.

The invention claimed is:

1. A method for providing service access to a user, comprising the steps of:
   a) registering a local identity provider located in a local network at a global identity provider with a local network identifier of the local identity provider;
   b) requesting service access requiring identity authentication to a service provider by a user located in the local network;
   c) requesting an identity management service from the global identity provider by the service provider;
   d) redirecting the access request of the user to the local identity provider according to the provided local network identifier within the local network;
   e) checking when the local identifier corresponds to the local network of the user;
   f) providing the requested identity management service to the service provider by the global identity provider in accordance with a result of the checking according to step e); and
   g) granting service access for the user to the service provider.

2. The method according to claim 1, wherein at least step a) includes initiating a session between the local identity provider and the global identity provider.

3. The method according to claim 2 wherein the user is connected to its local network by a virtual private network, a tunnel application or a reverse NAT.

4. The method according to claim 2, wherein at least the registering according to step a) uses a transport security protocol and/or a service security protocol.

5. A method according to claim 2, wherein the local identifier is provided in form of an IP-address and/or a MAC-address.

6. The method according to claim 2, wherein the initiating the session between the local identity provider and the global identity provider occurs for a predetermined time-period.

7. The method according to claim 1, wherein the user is connected to its local network by a virtual private network, a tunnel application or a reverse NAT.

8. The method according to claim 1, wherein at least the registering according to step a) uses a transport security protocol and/or a service security protocol.

9. The method according to claim 8, wherein at least the registering according to step a) uses HTTPS transport security protocol.

10. The method according to claim 8, wherein at least the registering according to step a) uses XML-SIG and/or XML-ENC service security protocol.

11. The method according to claim 1, wherein the local identifier is provided in form of an IP-address and/or a MAC-address.

12. A system for providing service access to a user, the system for performing the method according to claim 1, comprising:
   a user computer located in the local network for the user for accessing service of the service provider requiring authentication located in the global network;
   the local identity provider, located in the local network and connected to the user computer having a local identifier and connected to a global network; and
   the global identity provider, connected to the global network and to the local network,
   wherein the local identity provider is associated with the local identifier and is configured to register at the global identity provider with the local identifier,
   the identity management service is requested from the global identity provider by the service provider when the user requests the service access to the service provider,
   the global identity provider is configured to redirect the access request of the user to the local identity provider according to the provided local identifier within the local network,
   the local identity provider is configured to check when the local identifier corresponds to the local network of the user,
   the global identity provider is configured to provide the requested identity management service to the service provider according to a result of the check, and
   the service provider is configured to grant access for the user according to the provided identity management service.

13. The system according to claim 12, wherein the local identity provider is a home gateway for connecting the local network to the global network.

14. The system according to claim 13, wherein the user computer is connected to the local identity provider by a virtual private network, a tunnel application or a reverse NAT.

15. The system according to claim 12, wherein the user computer is connected to the local identity provider by a virtual private network, a tunnel application or a reverse NAT.

16. The system according to claim 12, wherein network traffic communication in the local network is encrypted.

17. The system according to claim 12, wherein the check of the local identifier of the local identity provider is MAC-address and/or IP-address based.

18. The system according to claim 12, wherein the global network is the Internet.

* * * * *